(12) United States Patent
Perlman et al.

(10) Patent No.: US 7,633,521 B2
(45) Date of Patent: Dec. 15, 2009

(54) APPARATUS AND METHOD IMPROVING MARKER IDENTIFICATION WITHIN A MOTION CAPTURE SYSTEM

(75) Inventors: Stephen G. Perlman, Palo Alto, CA (US); Greg LaSalle, San Francisco, CA (US); Kenneth A. Pearce, San Francisco, CA (US); John Speck, Sunnyvale, CA (US)

(73) Assignee: OnLive, Inc., Palo Alto, CA (US)

( * ) Notice: Subject to any disclaimer, the term of this patent is extended or adjusted under 35 U.S.C. 154(b) by 734 days.

(21) Appl. No.: 11/066,954

(22) Filed: Feb. 25, 2005

(65) Prior Publication Data
US 2006/0192854 A1   Aug. 31, 2006

(51) Int. Cl.
*H04N 7/18* (2006.01)
(52) U.S. Cl. .................................................. 348/154
(58) Field of Classification Search ................ 349/154; 359/497, 502, 253; 345/419, 475, 473; 702/153; *H04N 7/81*
See application file for complete search history.

(56) References Cited

U.S. PATENT DOCUMENTS

| | | | |
|---|---|---|---|
| 3,699,856 A | 10/1972 | Chabot, et al. | |
| 4,389,670 A | 6/1983 | Davidson et al. | |
| 5,227,985 A | 7/1993 | DeMenthon | |
| 5,235,416 A | 8/1993 | Stanhope | |
| 5,304,809 A | 4/1994 | Wickersheim | |
| 5,569,317 A | 10/1996 | Sarada et al. | |
| 6,020,892 A | 2/2000 | Dillon | |
| 6,148,280 A | 11/2000 | Kramer | |
| 6,151,118 A | 11/2000 | Norita et al. | |
| 6,243,198 B1 * | 6/2001 | Sedlmayr | 359/483 |
| 6,473,717 B1 * | 10/2002 | Claussen et al. | 702/153 |
| 6,487,516 B1 | 11/2002 | Amorai-Moriya | |
| 6,513,921 B1 | 2/2003 | Houle | |

(Continued)

FOREIGN PATENT DOCUMENTS

WO   WO 99/55220   11/2000

(Continued)

OTHER PUBLICATIONS

Graham, M., "The Power of Texture: A New Approach for Surface Capture of the Human Hand," Apr. 30, 2004, Carnegie Mellon University Computer Science Department, pp. 1-23.

(Continued)

*Primary Examiner*—Tung Vo
(74) *Attorney, Agent, or Firm*—Blakely Sokoloff Taylor & Zafman LLP

(57) ABSTRACT

A system, apparatus and method are described for improving marker identification within a motion capture system. For example, a system according to one embodiment of the invention comprises: a plurality of cameras configurable for a motion capture session, each of the cameras having an illuminating device for generating light and a lens for capturing light reflected off of one or more retro-reflective markers used for the motion capture session; and a plurality of pieces of polarized material coupled over the illuminating device and the lens of each of the cameras, wherein for each individual camera, either a first orientation or a second orientation for the polarized material is selected based on which other cameras are within the individual camera's field of view and the orientation of the polarized material used for the other cameras, the first orientation being perpendicular to the second orientation.

15 Claims, 15 Drawing Sheets

U.S. PATENT DOCUMENTS

| | | | |
|---|---|---|---|
| 6,554,706 B2* | 4/2003 | Kim et al. | 463/36 |
| 6,592,465 B2 | 7/2003 | Lutz et al. | |
| 6,633,294 B1 | 10/2003 | Rosenthal et al. | |
| 6,850,872 B1 | 2/2005 | Marschner et al. | |
| 6,943,949 B2* | 9/2005 | Sedlmayr | 359/497 |
| 7,068,277 B2 | 6/2006 | Menache | |
| 7,081,997 B2* | 7/2006 | Sedlmayr | 359/497 |
| 7,154,671 B2* | 12/2006 | Sedlmayr | 359/502 |
| 7,184,047 B1 | 2/2007 | Crampton | |
| 7,218,320 B2* | 5/2007 | Gordon et al. | 345/419 |
| 7,333,113 B2* | 2/2008 | Gordon | 345/475 |
| 7,358,972 B2* | 4/2008 | Gordon et al. | 345/473 |
| 7,369,681 B2 | 5/2008 | Foth et al. | |
| 2003/0095186 A1 | 5/2003 | Aman et al. | |
| 2005/0105772 A1 | 5/2005 | Voronka et al. | |
| 2006/0061680 A1 | 3/2006 | Madhavan et al. | |
| 2006/0192785 A1 | 8/2006 | Marschner et al. | |
| 2007/0024946 A1* | 2/2007 | Panasyuk et al. | 359/253 |

OTHER PUBLICATIONS

Guskov, I., et al., "Trackable Surfaces," Jul. 2003, SIGGRAPH 2003, pp. 251-257, 379.

Parke, F., "Computer Generated Animating of Faces," 1972, SIGGRAPH 1972, pp. 451-457.

Scott, R., Sparking Life Notes on the Performance Capture Sessions for The Lord of the Rings: The Two Towers, Nov. 2003, ACM SIGGRAPH vol. 37, No. 4, pp. 17-21.

Vicon, Vicon Motion Picture Ltd., 2 pgs, printed Feb. 25, 2005, www.vicon.com/jsp/index.jsp.

Vicon—Products, Vicon MX: System Overview, 2 pgs., printed Feb. 25, 2005, www.vicon.com/jsp/products/product-overview.jsp.

Vicon—Products, MX System: Cameras, "The Most Powerful, Practical and Versatile Range of Motion Capture Cameras," 1 pg., printed Feb. 25, 2005,.www.vicon.com/jsp/products/product-category.jsp?cat=cameras.

Vicon, Vicon Motion Systems // MX3, MX3 Camera, The MX3 0.3 Million-pixel Motion Capture Camera, 2 pgs., printed on Feb. 25, 2005, www.vicon.com/jsp/products/product-detail.jsp?id=173.

Vicon, Vicon Motion Systems // MX13, MX13 Camera, The MX13 1.3 Million-pixel Motion Capture Camera, 2 pgs., printed on Feb. 25, 2005, www.vicon.com/jsp/products/prdouct-detail.jsp?id=170.

Vicon, Vicon Motion Systems // MX40, MX40 Camera, The MX40 4 Million-pixel Motion Capture Camera, 2 pgs., printed on Feb. 25, 2005, www.vicon.com/jsp/products/product-detail.jsp?id=167.

Vicon, Vicon motion Systems // SV Cam, 1 pg., printed on Feb. 25, 2005, www.vicon.com/jsp/products/product-detail.jsp?id+189.

Motion Analysis Corporation, The Motion Capture Leader, 1 pg., printed on Feb. 25, 2005, www.motionanalysis.com/.

MotionAnalysis, Video Game Products, Products, 1 pg., printed Feb. 25, 2005, www.motionanaylsis.com/applications/animation/games/produtcs.html.

MotionAnalysis, Eagle Digital System, 4 pgs., printed on Feb. 25, 2005, www.motionanalysis.com/applications/animation/games/eaglesystem.html.

MotionAnalysis, Hawk Digital System, 4 pgs., printed on Feb. 25, 2005, www.motionanalysis.com/applications/animation/games/hawksytem.html.

MotionAnalysis, Falcon Analog System, 4 pgs., printed on Feb. 25, 2005, www.motionanaylsis.com/applications/animation/games/falconsystem.html.

Bascle, B., et al., "Separability of Pose and Expression in Facial Tracking and Animation", IEEE Computer Society, Proceedings of the Sixth International Conference on Computer Vision, (1998), 323-328.

Chuang, Erika, et al., "Performance Driven Facial Animation using Blendshape Interpolation", *Computer Science Department, Stanford University*, (Apr. 2002), 8 pages.

Guenter, Brian, et al., "Making Faces", *International Conference on Computer Graphics and Interactive Techniques, Proceedings of the 25th Annual Conference on Computer Graphics and Interactive Techniques*, (1998), 55-66.

* cited by examiner

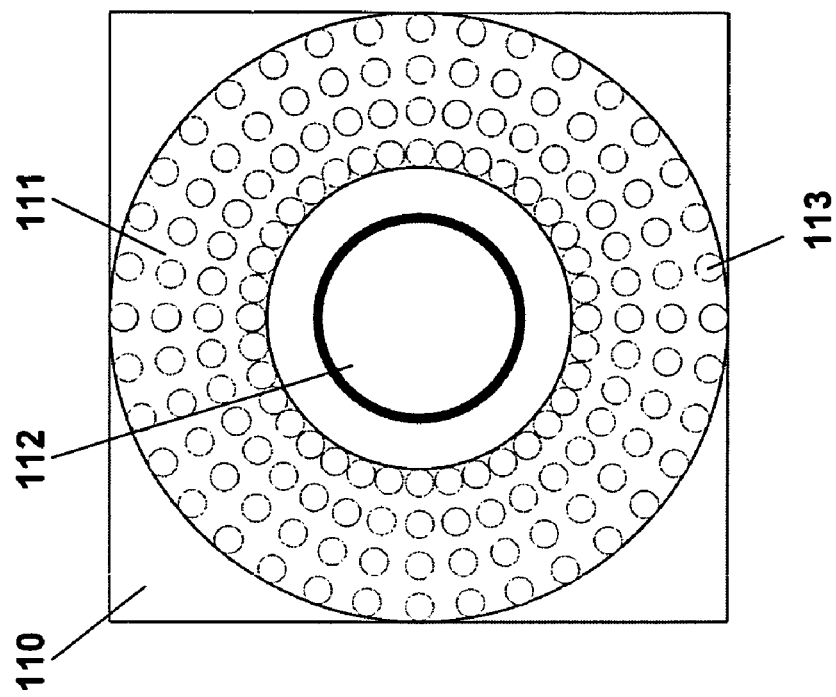
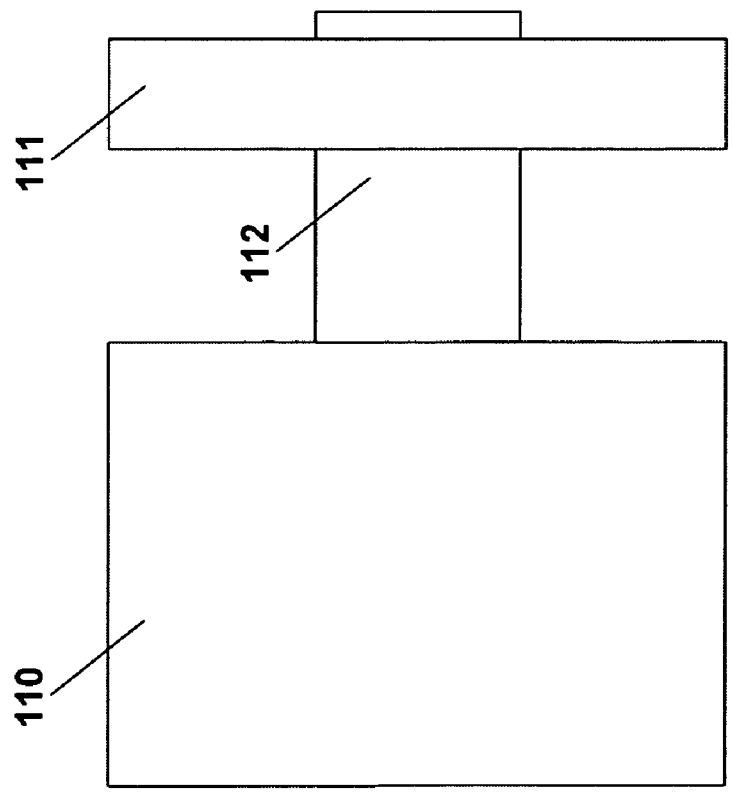
Front View
Side View
*Fig. 1b*
(prior art)

APPARATUS AND METHOD IMPROVING MARKER IDENTIFICATION WITHIN A MOTION CAPTURE SYSTEM

BACKGROUND OF THE INVENTION

1. Field of the Invention

This invention relates generally to the field of motion capture. More particularly, the invention relates to an apparatus and method for improving marker identification within a motion capture system.

2. Description of the Related Art

"Motion capture" refers generally to the tracking and recording of human and animal motion. Motion capture systems are used for a variety of applications including, for example, video games and computer-generated movies. In a typical motion capture session, the motion of a "performer" is captured and translated to a computer-generated character.

As illustrated in FIG. 1a in a motion capture system, a plurality of motion tracking "markers" (e.g., markers 101, 102) are attached at various points on a performer's 100's body. The points are selected based on the known limitations of the human skeleton. Different types of motion capture markers are used for different motion capture systems. For example, in a "magnetic" motion capture system, the motion markers attached to the performer are active coils which generate measurable disruptions x, y, z and yaw, pitch, roll in a magnetic field. By contrast, in an optical motion capture system, such as that illustrated in FIG. 1a, the markers 101, 102 are passive spheres comprised of retro-reflective material, i.e., a material which reflects light back in the direction from which it came, ideally over a wide range of angles of incidence. A plurality of cameras 120, 121, 122, each with a ring of LEDs 130, 131, 132 around its lens, are positioned to capture the LED light reflected back from the retro-reflective markers 101, 102 and other markers on the performer. Ideally, the retro-reflected LED light is much brighter than any other light source in the room. Typically, a thresholding function is applied by the cameras 120, 121, 122 to reject all light below a specified level of brightness which, ideally, isolates the light reflected off of the reflective markers from any other light in the room and the cameras 120, 121, 122 only capture the light from the markers 101, 102 and other markers on the performer.

A motion tracking unit 150 coupled to the cameras is programmed with the relative position of each of the markers 101, 102 and/or the known limitations of the performer's body. Using this information and the visual data provided from the cameras 120-122, the motion tracking unit 150 generates artificial motion data representing the movement of the performer during the motion capture session.

A graphics processing unit 152 renders an animated representation of the performer on a computer display 160 (or similar display device) using the motion data. For example, the graphics processing unit 152 may apply the captured motion of the performer to different animated characters and/or to include the animated characters in different computer-generated scenes. In one implementation, the motion tracking unit 150 and the graphics processing unit 152 are programmable cards coupled to the bus of a computer (e.g., such as the PCI and AGP buses found in many personal computers). One well known company which produces motion capture systems is Motion Analysis Corporation (see, e.g., www.motionanalysis.com).

FIG. 1b illustrates an exemplary motion capture camera 110. The camera 110 includes an illuminating ring 111 for directing light at the retro-reflective markers and a lens 112 for capturing light reflected off of the retro-reflective markers. As shown in the front view of the camera, the illuminating ring 111 generates light using a plurality of light emitting diodes ("LEDs") 113 distributed along the front surface of the ring (i.e., the surface facing the markers). LEDs are particularly useful for this application because they are capable of generating light that is projected in a particular direction. The lens 112 passes through the center of the illuminating ring 111, as illustrated. Cameras such as this are available from a variety of companies including Vicon (www.vicon.com) and Motion Analysis (www.motionanalysis.com).

FIG. 2 illustrates a bird's eye view of a motion capture session with a performer 100. The performer's head is identified as 205; the performer's arms are identified as 201 and 202; the performer's hands are identified as 203 and 204; and two retro-reflective markers are identified as 206 and 207.

As illustrated generally in FIG. 2, a significant number of cameras 210, 220, 230, 240, 250, 260, 270 and 280 may be used for a given motion capture session. For example, in the movie "Polar Express," recently released by Warner Bros. Pictures, as many as 64 cameras were used to capture certain scenes. Given the significant number of cameras used for these scenes, it becomes very likely that each camera will have several other cameras within its field of view. By way of example, camera 210 in FIG. 2 has three different cameras 240, 250, and 260, within its field of view.

One problem which results from this configuration is illustrated in FIGS. 3-4 which shows light rays 311 and 313 emanating from the illuminating ring of camera 210 and light rays 351 and 354 emanating from the illuminating ring of camera 250. Light ray 311 hits retro-reflective marker 206 and reflects directly back (or almost directly back) to camera 210 as light ray 312. The position of the retro-reflective element 206 may then be identified and processed as described above. Similarly, light ray 351 hits retro-reflective marker 207 and reflects directly back to camera 250 as light ray 352. However, instead of hitting a retro-reflective marker, light ray 314 is directed into the lens of camera 250 and light ray 354 is directed into the lens of camera 210. Since the light rays 314 and 354 are projected directly from an illuminating ring into a camera ring, they appear as very bright objects—as bright or even brighter than the light retro-reflected from markers 206 and 207. As a result the thresholding function of the motion capture system does not reject light rays 314 and 354, and cameras 210 and 250 capture more than just marker images.

FIG. 5 illustrates the view from camera 210 and FIG. 6 illustrates the elements which are captured by the camera 210 when a thresholding function is applied that eliminates all but the brightest objects in an effort to isolate the retro-reflective markers (the objects which are eliminated from the scene due to the thresholding function are shown as dotted lines). As illustrated, in addition to capturing light from the retro-reflective markers on the performer's body (such as marker 501), camera 210 also captures light emitted from the illuminating rings 541, 551, and 561 (i.e., because light from the illuminating rings will tend to be as bright or brighter than the light reflected off of the retro-reflective markers)

This becomes a problem for obvious reasons, i.e., the motion capture logic associated with camera 210 may misinterpret light ray 354 as a retro-reflective element, and the motion capture logic associated with camera 250 may misinterpret light ray 314 as a retro-reflective element. As a result, following a performance, a significant amount of "clean up" is typically required during which computer programmers or animators manually identify and remove each of the misinterpreted elements, resulting in significant additional production costs.

Current motion capture studios attempt to address this problem by positioning the cameras carefully so that no one camera is directed into the field of view of any other camera. For example, cameras 240, 250, and 260 may be removed from the field of view of camera 210 if they are positioned at a significantly different elevation than camera 210 or camera 210 is aimed at an angle which does not have any other cameras in its field of view. However, even with careful positioning, in a production which utilizes a significant number of cameras (e.g., 64) some cameras will almost certainly have other cameras within their field of view. As such, improved techniques for limiting the number of misinterpreted markers within a motion capture system are needed.

SUMMARY

A system, apparatus and method are described for improving marker identification within a motion capture system. For example, a system according to one embodiment of the invention comprises: a plurality of cameras configurable for a motion capture session, each of the cameras having an illuminating device for generating light and a lens for capturing light reflected off of one or more retro-reflective markers used for the motion capture session; and a plurality of pieces of polarized material coupled over the illuminating device and the lens of each of the cameras, wherein for each individual camera, either a first orientation or a second orientation for the polarized material is selected based on which other cameras are within the individual camera's field of view and the orientation of the polarized material used for the other cameras, the first orientation being perpendicular to the second orientation.

BRIEF DESCRIPTION OF THE DRAWINGS

A better understanding of the present invention can be obtained from the following detailed description in conjunction with the drawings, in which:

FIG. 1*b* illustrates a prior art motion tracking camera which includes an illuminating ring.

DETAILED DESCRIPTION OF PREFERRED EMBODIMENTS

Described below is an improved apparatus and method for limiting the number of misidentified reflective markers within a motion capture system. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the invention.

EMBODIMENTS OF THE INVENTION

Figure 7:
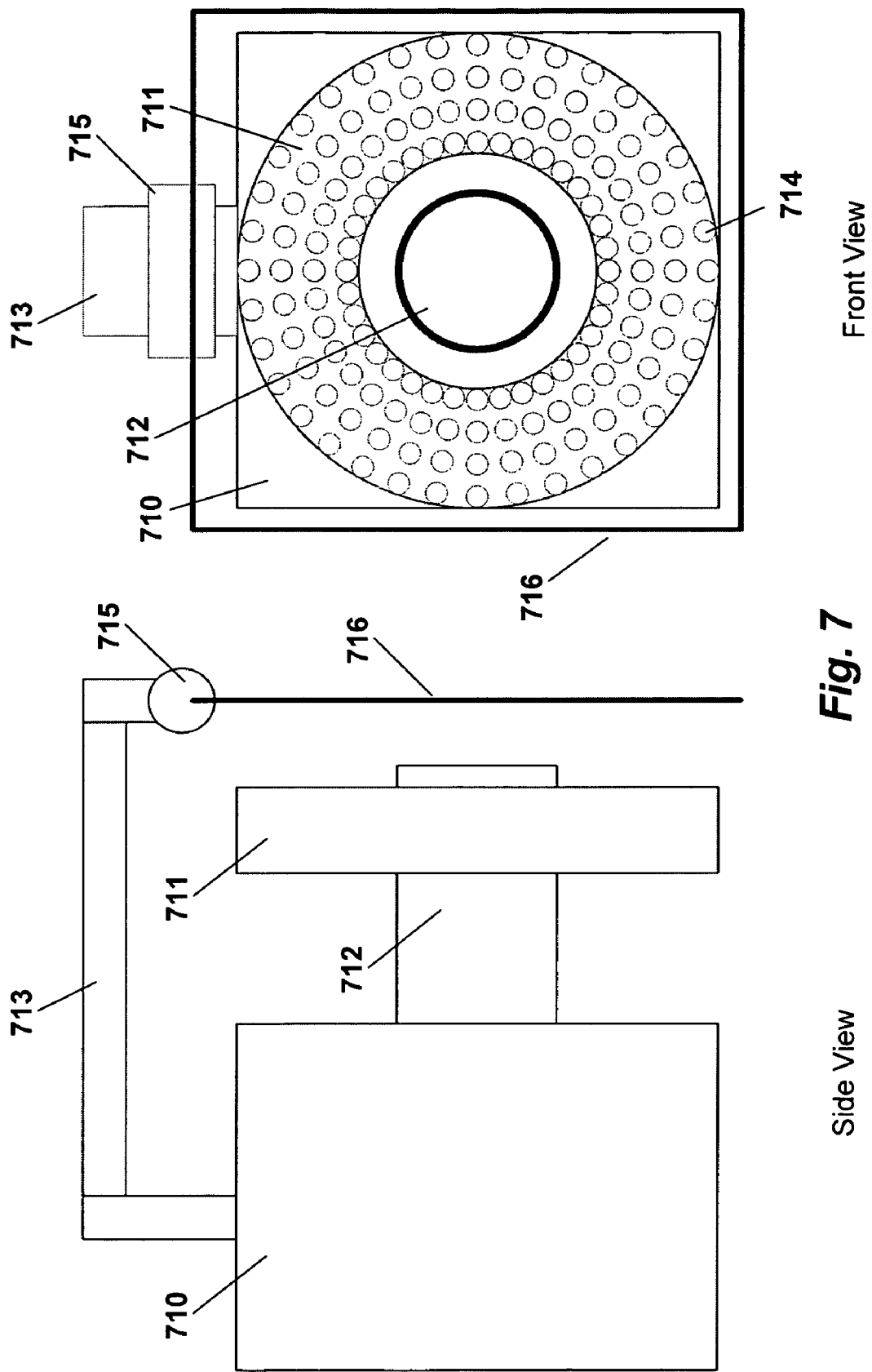
FIG. 7 illustrates one embodiment of an apparatus for improving marker identification.

FIG. 7 illustrates one embodiment of the invention which solves the problems associated with marker identification described above. As in prior motion capture systems, this embodiment includes a camera 710 with a lens 712 and an illuminating ring 711 (or other type of illuminating device). However, unlike prior systems, this embodiment includes a sheet of polarized material 716 positioned in front of the LEDs 713 on the illuminating ring 711 and the lens 712. In one embodiment, the polarized material 716 is polarized plastic. However, various other types of polarized material may be used while still complying with the underlying principles of the invention (e.g., polarized glass). This embodiment also includes an armature 714 to support the polarized material, and a clip 715 to hold the polarized material in place.

As is known in the art, the electromagnetic ("EM") field of unpolarized light has vectors in many different orientations. A polarized material filters EM fields in all orientations except for one. For example, a vertically-polarized material will filter all EM fields except for the EM fields with a vertical orientation. Conversely, horizontally-polarized material will filter all EM fields except for the EM fields with a horizontal orientation. Consequently, if vertically-polarized light is directed at a horizontally-polarized filter, no light (theoretically) should pass through the filter. Polarizing light to one orientation, then blocking it with a polarizing filter in a different orientation is known as "cross-polarization." In practice cross-polarization doesn't completely block cross-polarized light, but it significantly attenuates it. Typical attenuation of brightness is 200:1.

Figure 8:
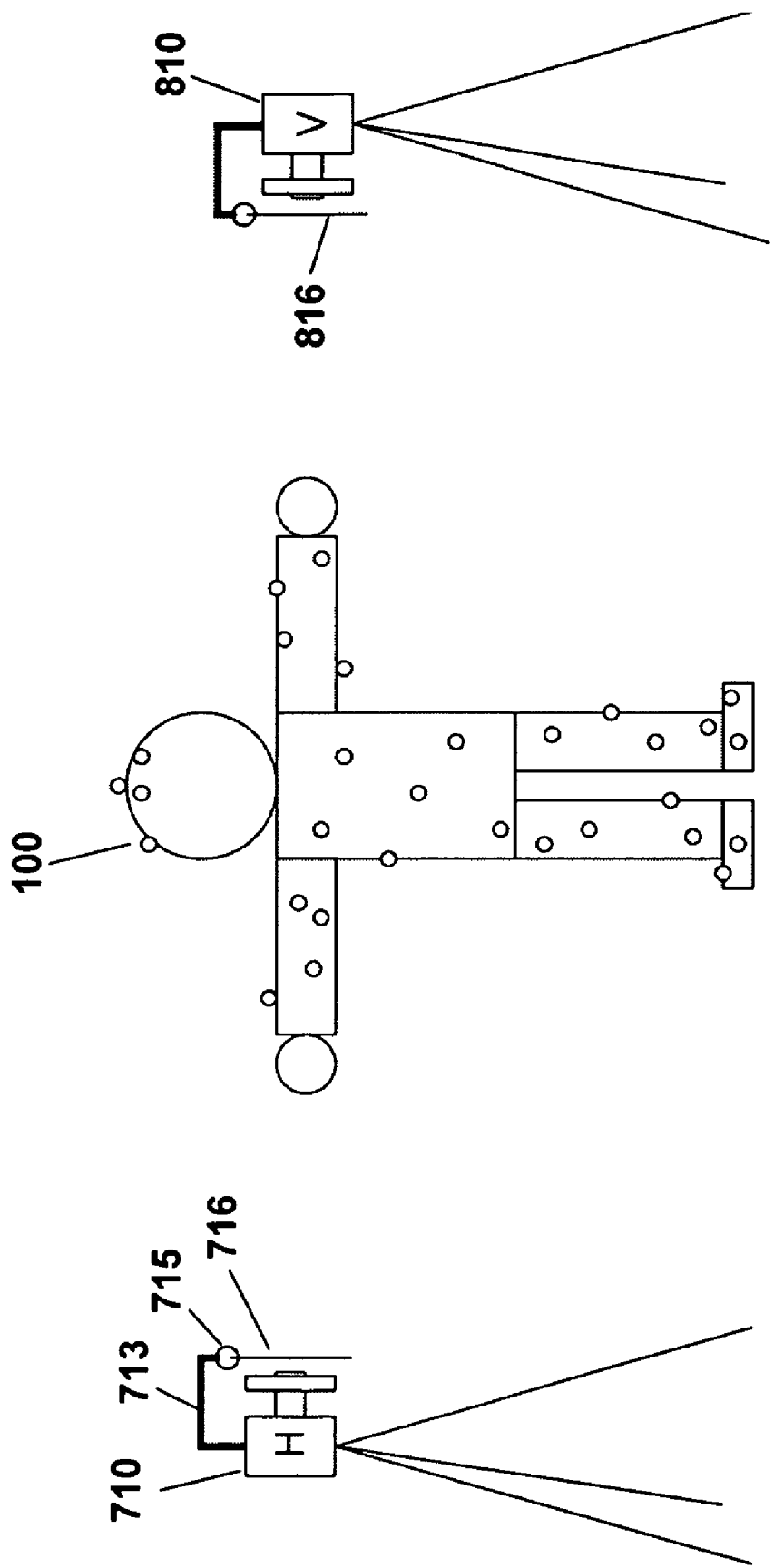
FIG. 8 illustrates one embodiment of the invention implemented within a motion capture session.

One embodiment of the invention relies on the foregoing principles to limit the number of misidentified reflective markers within a motion capture system. Specifically, referring to FIG. 8, in one embodiment, certain cameras 710 are configured with horizontally-polarized material 716 and other cameras 810 are configured with vertically-polarized material 816. In one embodiment, the cameras are then be positioned such that the only cameras within the field of view of cameras with horizontally-polarized material are cameras with vertically-polarized material, and the only cameras within the field of view of cameras with vertically-polarized material are cameras with horizontally-polarized material.

Figure 1A:
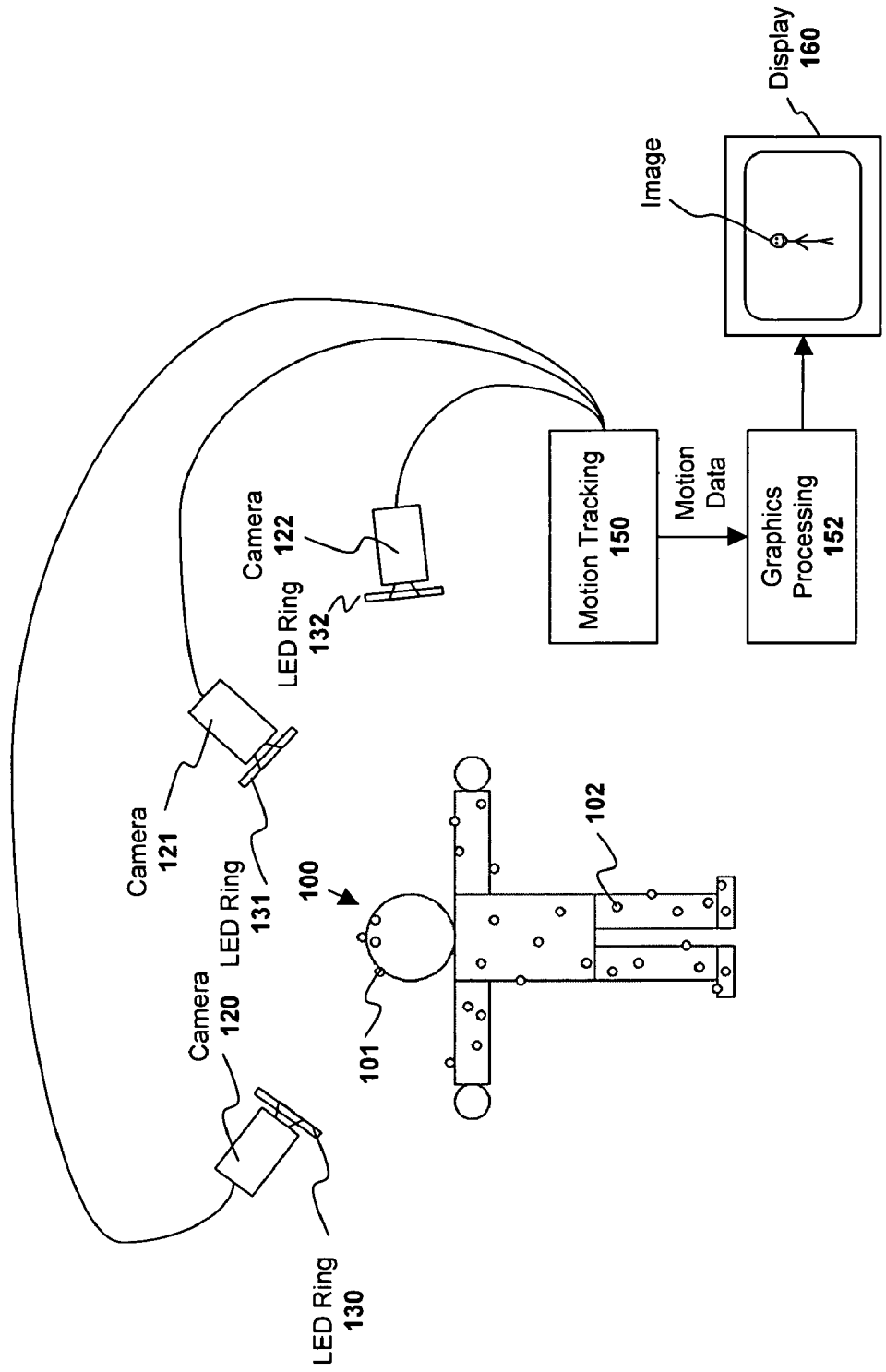
FIG. 1*a* illustrates a prior art motion capture system for tracking the motion of a performer using retro-reflective elements and cameras.
Figure 2:
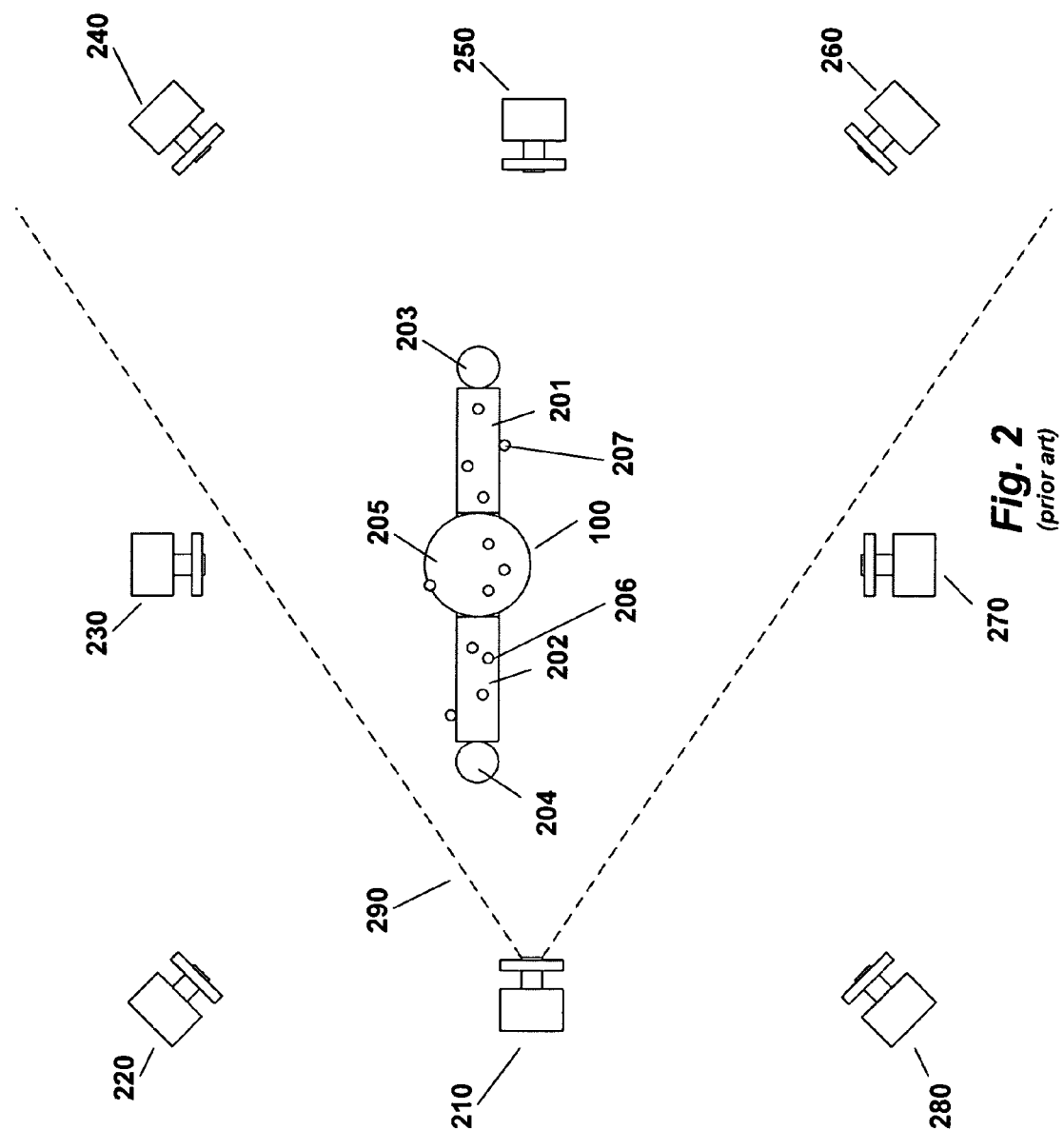
FIG. 2 illustrates a plurality of cameras spaced around a performer in an exemplary motion capture session.
Figure 3:
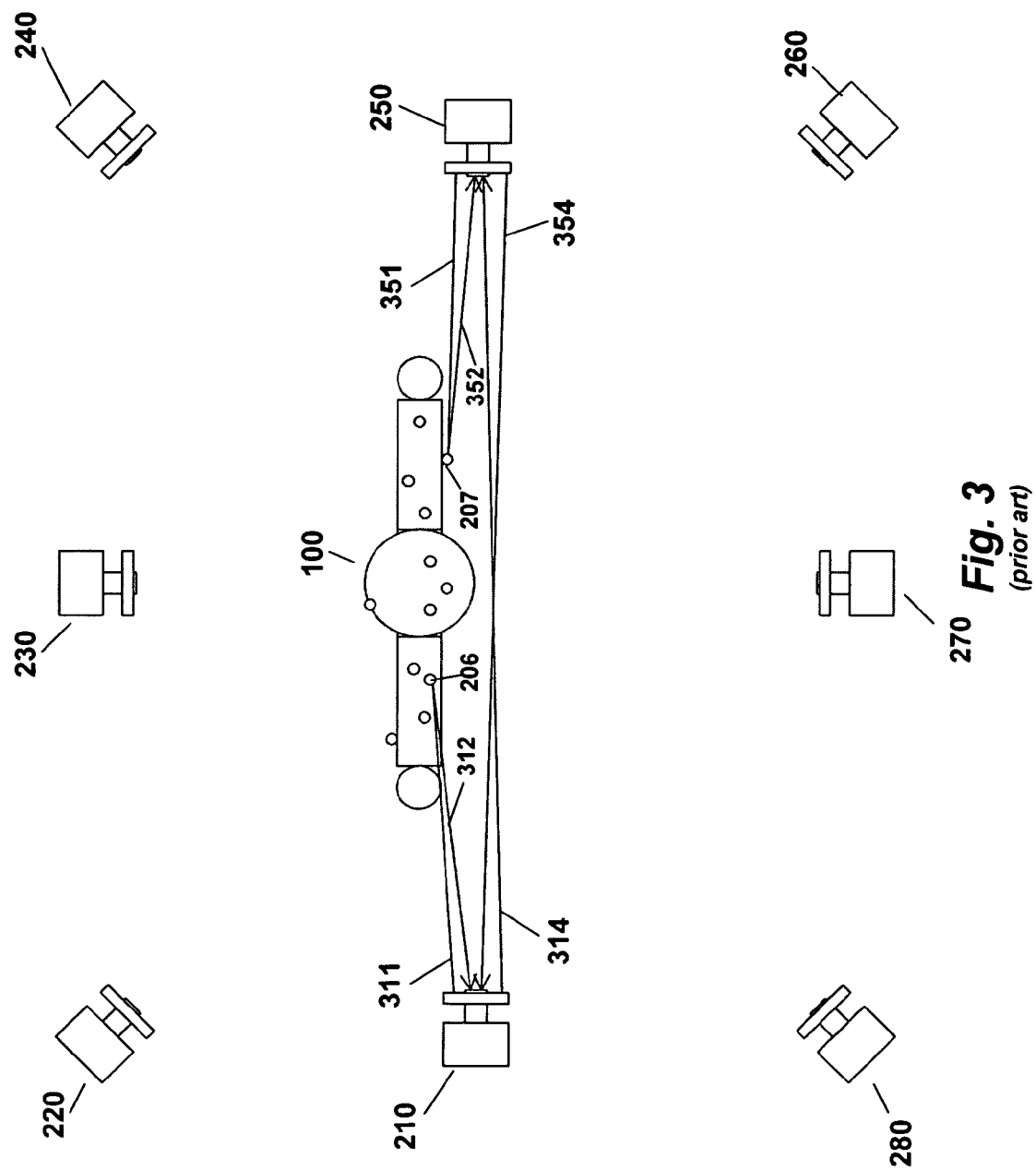
FIG. 3 illustrates a bird's eye view of light transmitted between two cameras which are directly across from one another in a motion capture session.
Figure 4:
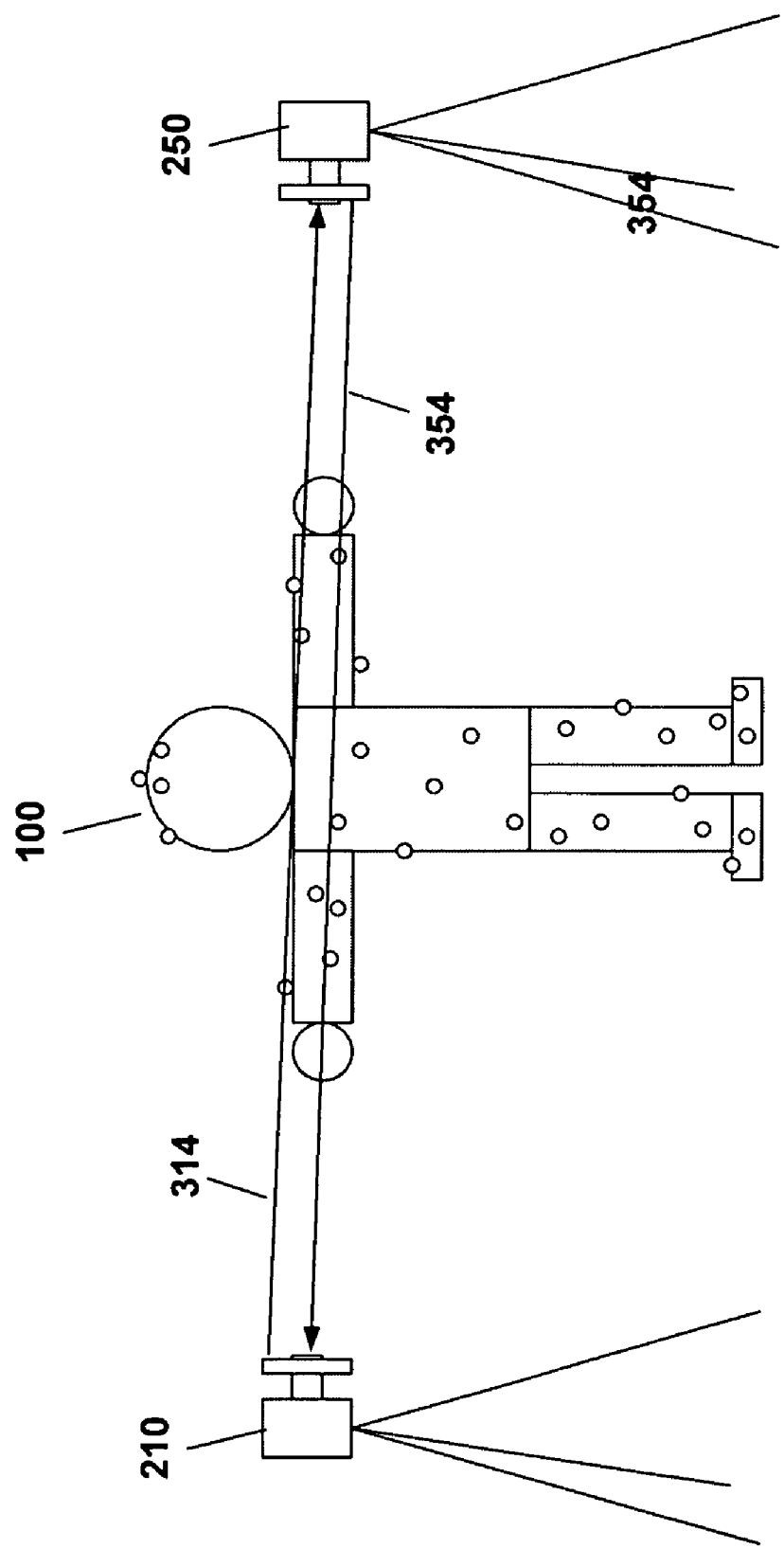
FIG. 4 illustrates a front view of light transmitted between two cameras which are directly across from one another in a motion capture session.
Figure 5:
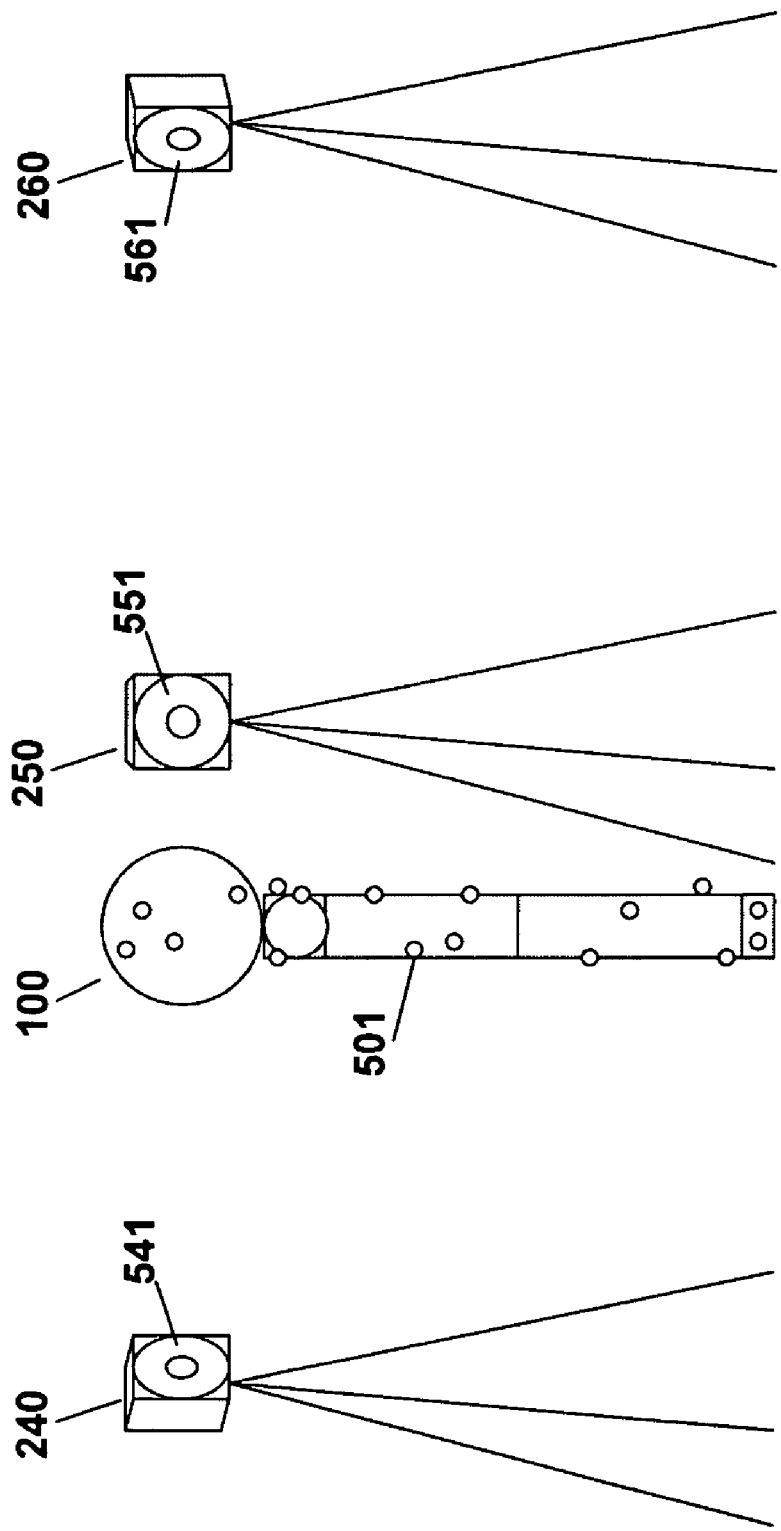
FIGS. 5-6 illustrate a view from a particular camera within a motion capture session.
Figure 6:
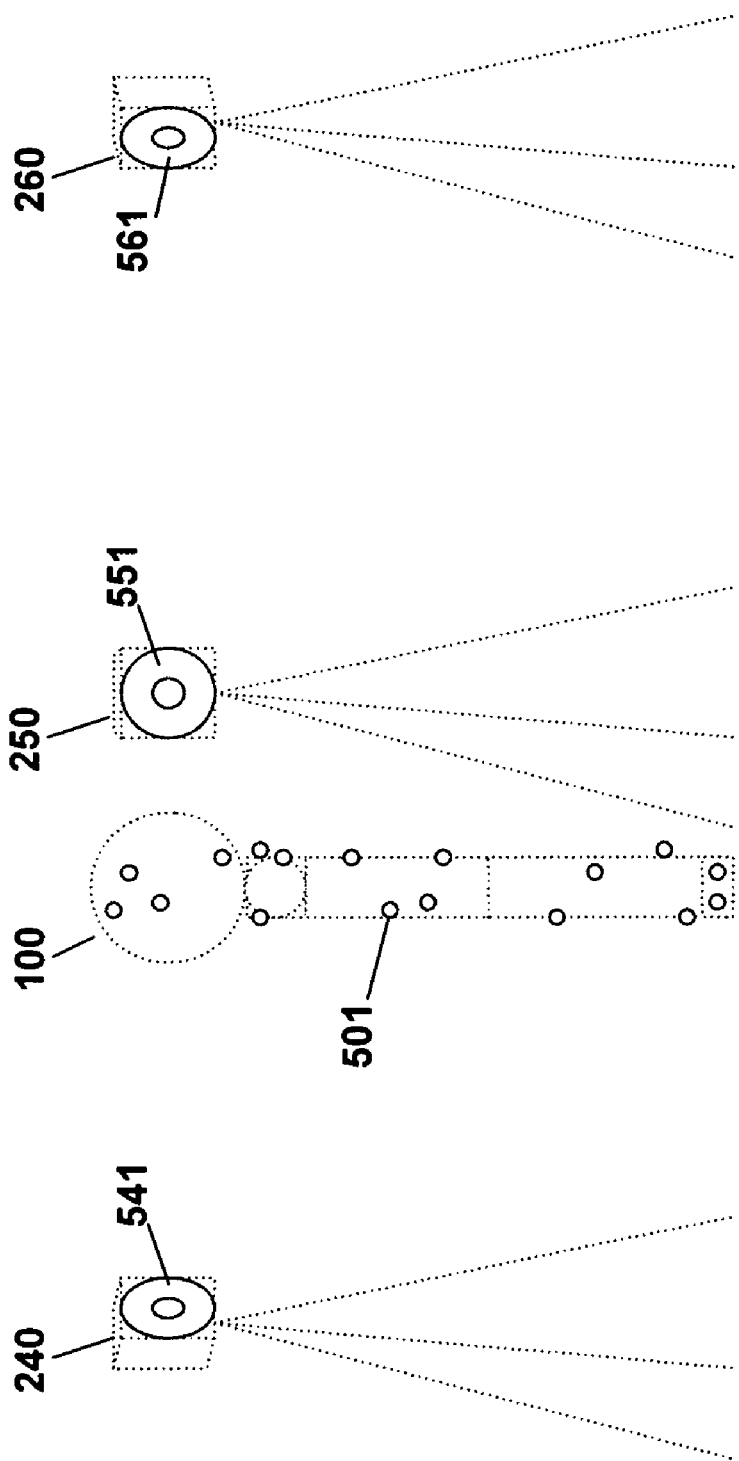
Figure 9:
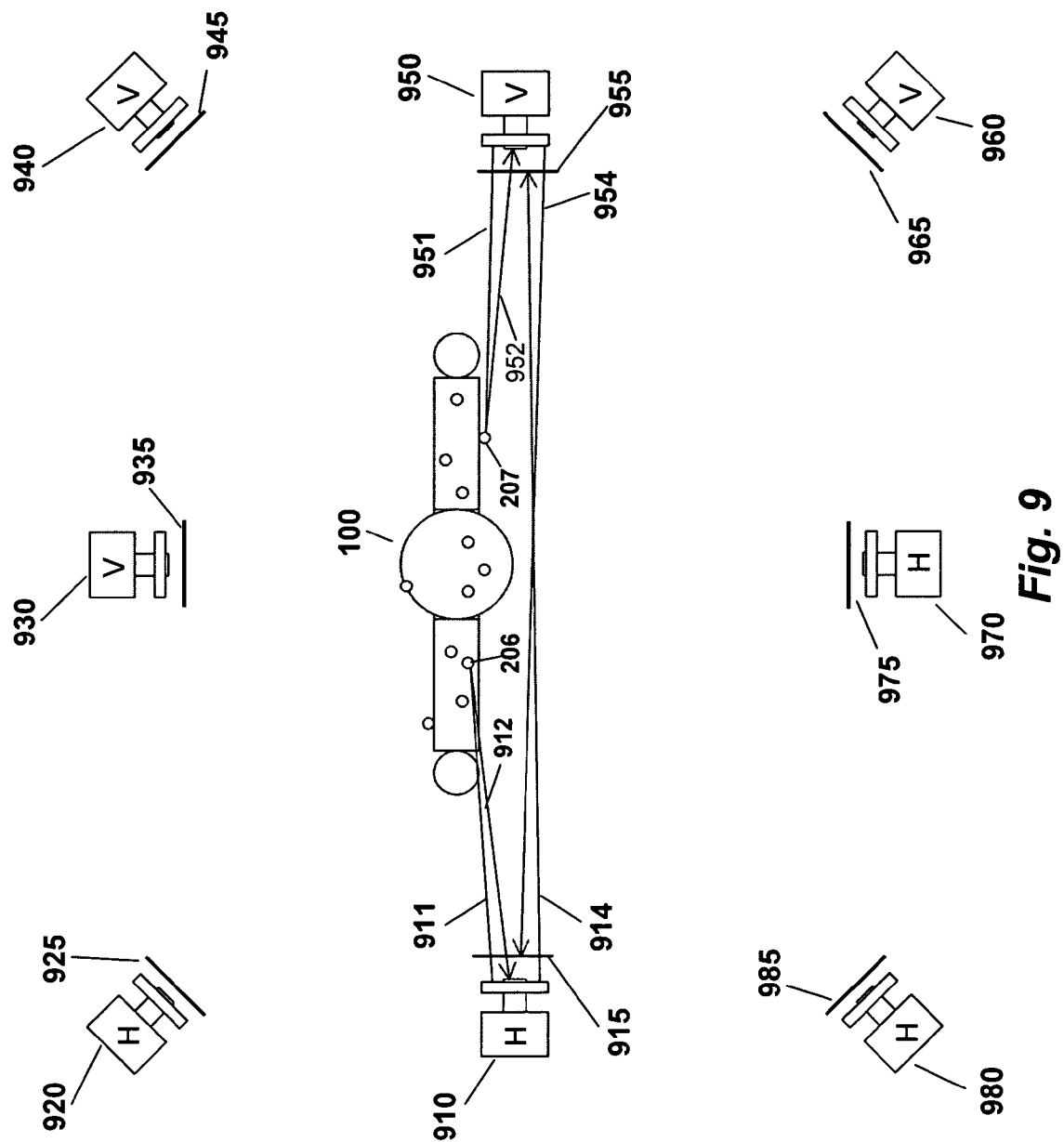
FIG. 9 illustrates a system including an arrangement of cameras according to one embodiment of the invention.

This is illustrated generally in FIG. 9 which shows a bird's-eye view of the performer 100 similar to FIG. 3. Unlike FIG. 3, however, each camera in FIG. 9 is configured with either vertically- or horizontally-polarized material. For example, cameras 910, 920, 970 and 980 are configured with horizontally-polarized material 915, 925, 975 and 985, respectively; and cameras 930, 940, 950 and 960 are configured with vertically-polarized material. An attempt is made to position the cameras such that each camera with horizontally-polarized only has cameras with vertically polarized material within its field of view, and each camera with vertically-polarized only has cameras with horizontally-polarized material within its field of view. As described below, in some cases, prior art techniques for positioning cameras are also employed.

Light rays 911 and 914 emanate from the illuminating ring of camera 910 and pass through the horizontally-polarized material 915 of camera 910, thereby becoming horizontally polarized. Light rays 951 and 954 emanate from the illuminating ring of camera 950 and pass through the vertically-polarized material 955 of camera 950, thereby becoming vertically polarized. Light ray 911 hits retro-reflective marker 206 and reflects directly back (or almost directly back) towards camera 910 as light ray 912. Because light maintains its polarization after reflection, light ray 912 is horizontally-polarized. As a result, the horizontally-polarized material 915 allows light ray 912 to pass through to camera 910 with minimal attenuation. The position of the retro-reflective element 906 may then be identified and processed as described above. Similarly, light ray 951 hits retro-reflective marker 207 and reflects directly back towards camera 950 as light ray 952. Because light ray 952 is vertically polarized, the vertically-polarized material 955 allows it to pass through to camera 950.

Light ray 914 passes through the horizontally-polarized material 915 of camera 910, thereby becoming horizontally polarized, and is directed straight into camera 950. However, as illustrated in FIG. 9, because light ray 914 is horizontally polarized, it is filtered out by the vertically-polarized material 955 configured on camera 950. Similarly, light ray 954 passes through the vertically-polarized material 955 of camera 950, thereby becoming vertically polarized, and is directed straight at camera 910. However, because light ray 954 is vertically polarized, it is filtered out by the horizontally-polarized material 915 configured on camera 910. The end result is that the two cameras 910 and 950 will not misinterpret one another as retro-reflective elements, thereby significantly reducing the amount of "clean up" required after the performance.

Figure 10:
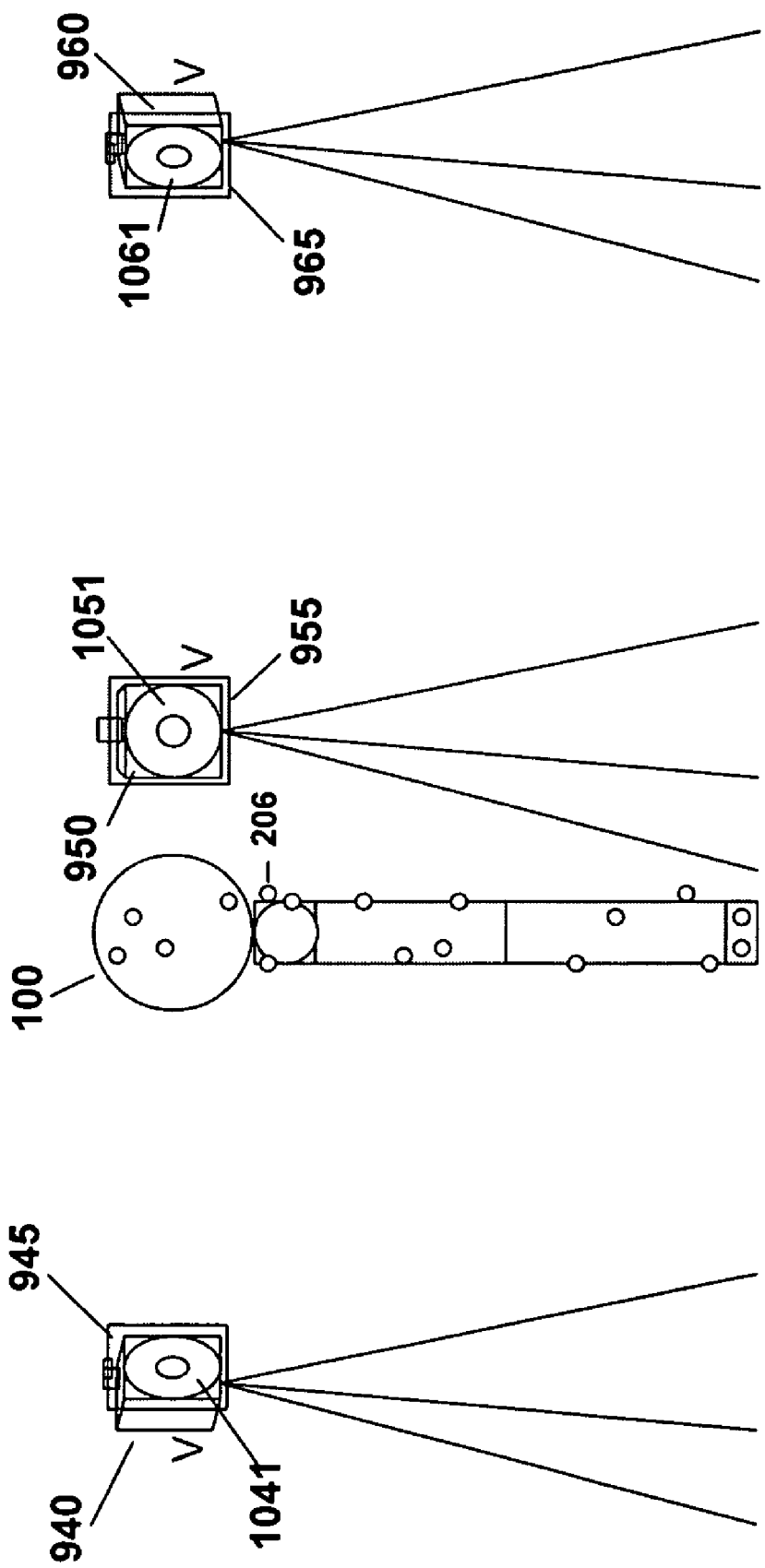
FIGS. 10-11 illustrate a view from a camera according to one embodiment of the invention.
Figure 11:
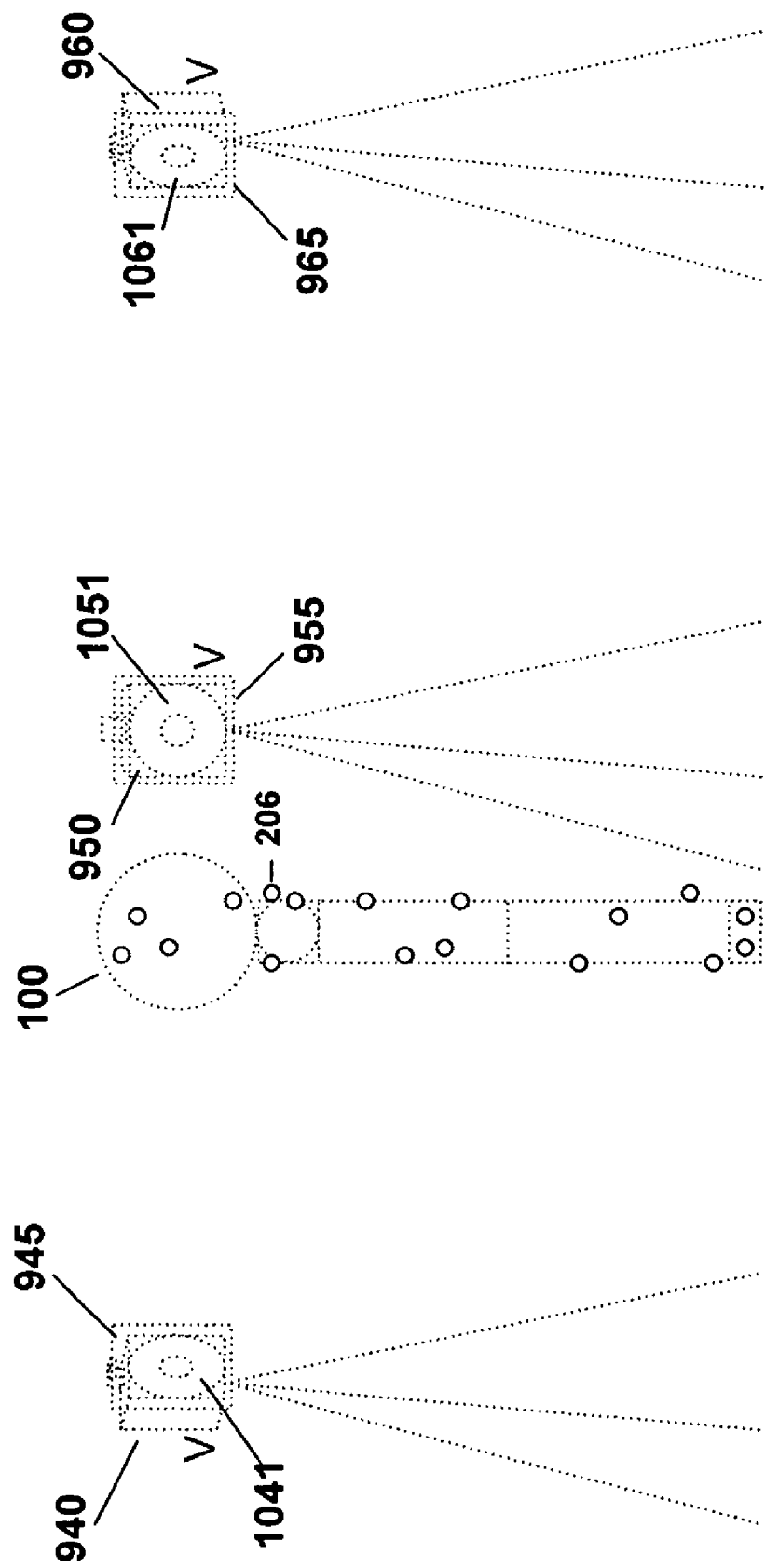

FIG. 10 illustrates the view from camera 910. As illustrated, all three cameras 940, 950 and 960 within its field of view are configured with vertically-polarized material 945, 955, and 965, respectively. As such, as illustrated in FIG. 11, when the thresholding function is applied to identify the retro-reflective markers, the light from the illuminating rings 1041, 1051, and 1061 is filtered and only the markers, such as marker 206, will be identified. The objects rejected by the thresholding function are shown with dotted lines.

Although the foregoing discussion focuses on cameras 910 and 950 for the purpose of illustration, the same general principles apply to each of the cameras illustrated in FIG. 9. For example, cameras 930 and 970; cameras 960 and 920; and cameras 980 and 940 will not "see" one another during the performance.

Figure 12:
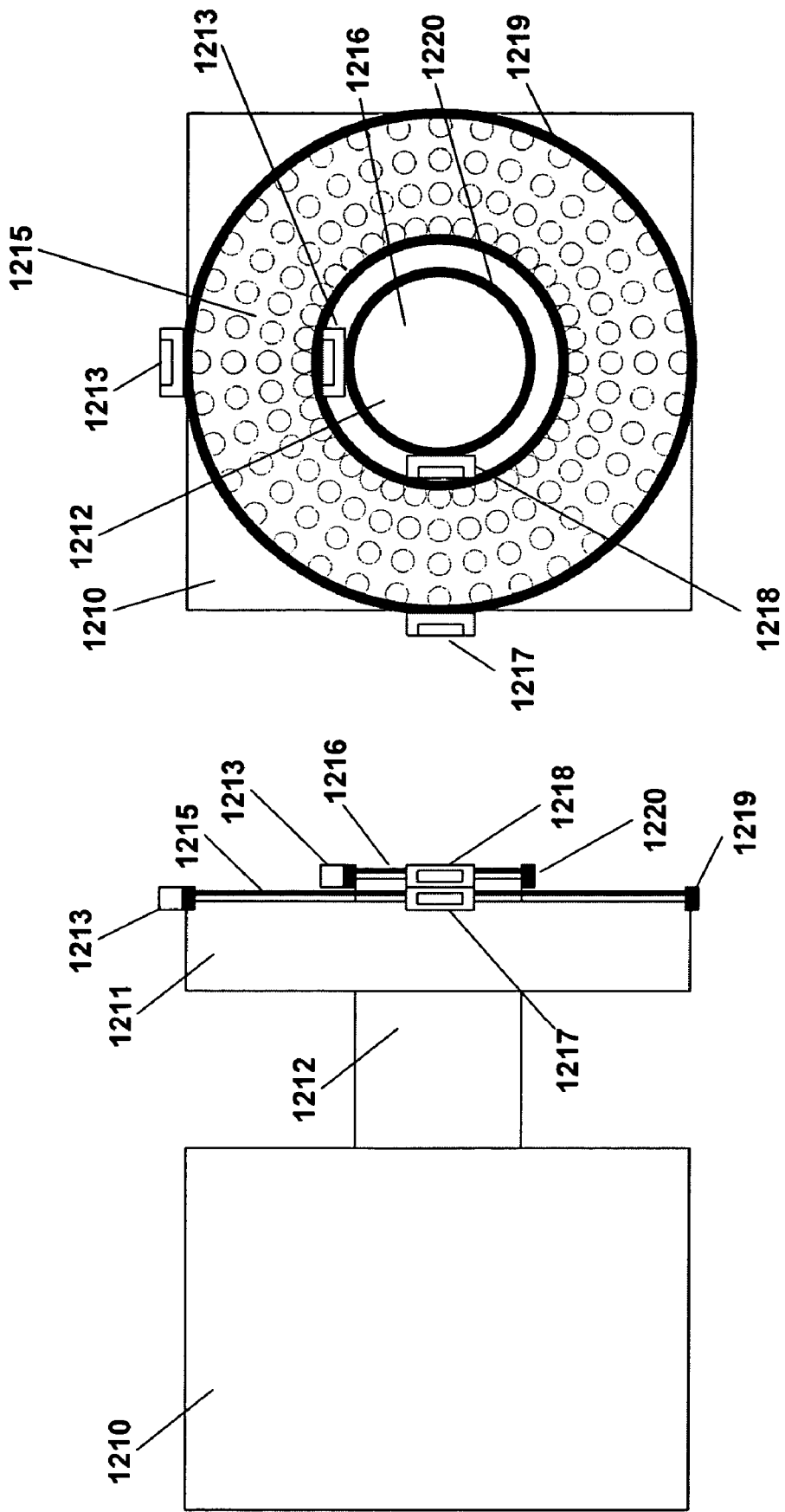
FIG. 12 illustrates an apparatus according to one embodiment of the invention.

FIG. 12 illustrates another embodiment of the invention which employs two independently-adjustable pieces of polarized material. As in prior systems, this embodiment includes a motion capture camera 1210 with a lens 1212 and an illuminating ring 1211 (or other illuminating structure). A first piece of polarized material 1215 is attached over the illuminators (e.g., LEDs) on the illuminating ring 1211, and a second piece of polarized material 1216 is attached to the front of the lens 1212. In one embodiment, a first threaded ring 1219 is attached to the outer perimeter of the illuminating ring and a second threaded ring 1220 is attached to the outer perimeter of the lens, as illustrated. The first piece of polarized material 1215 is held in place within the inner thread of the first threaded ring 1219 and the second piece of polarized material 1216 is held in place within the inner thread of the second threaded ring 1220. The two pieces of polarized material 1215 and 1216 may be rotated within the first and second threaded rings, respectively. As a result, the polarization for the lens 1212 and the illuminating ring 1211 may be independently adjusted. Thus, the orientation (horizontal or vertical) of the polarization associated with each of the cameras may be easily modified (e.g., after the cameras are positioned).

In addition, in one embodiment, one or more spirit levels 1213, 1217 and 1214, 1218 are affixed to the outer surface of the first piece of polarized material 1216 and the second piece of polarized material 1216, respectively. The spirit levels are particularly useful because they indicate whether the polarized materials 1215, 1216 are in a horizontal and/or vertical position relative to the ground (as opposed to the cameras). Since cameras are often positioned at odd angles, the spirit levels establish an absolute reference for horizontal or vertical orientation.

Also, in one embodiment a single ring holding polarized material covers both the lens and the illuminating ring. And in yet another embodiment this single ring has a spirit levels attached to it to achieve an absolute orientation of horizontal or vertical relative to the ground.

It should be obvious to a practitioner skilled in the art that in the previous embodiments other leveling techniques, both passive and electronic, can be used in place of spirit levels. It should also be obvious that many known mechanical techniques can be used to attach the polarizing filters to the lens and/or illuminating ring in addition to the threaded rings described above.

Figure 13:
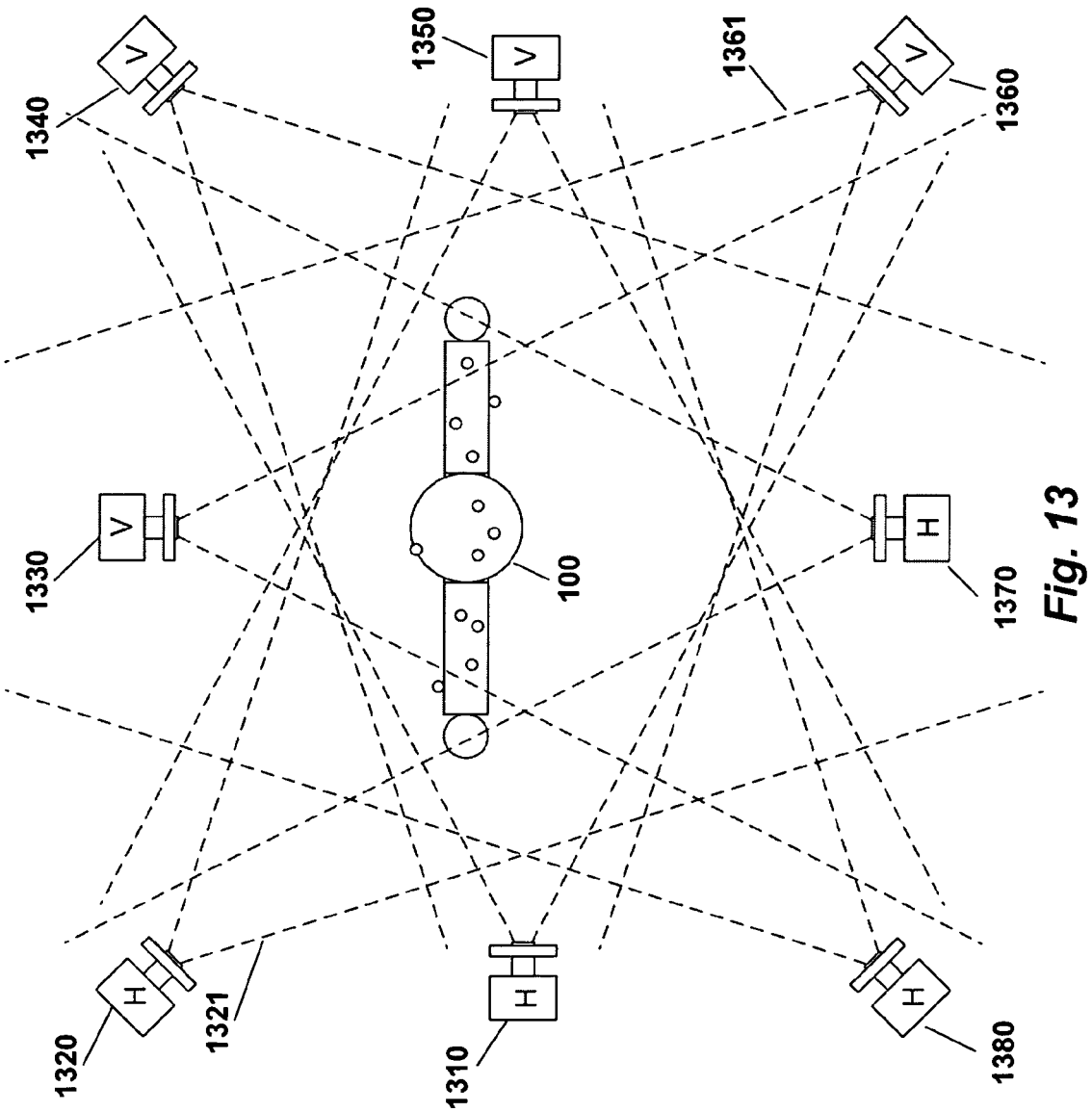
FIGS. 13-14 illustrate a camera arrangement according to one embodiment of the invention.
Figure 14:
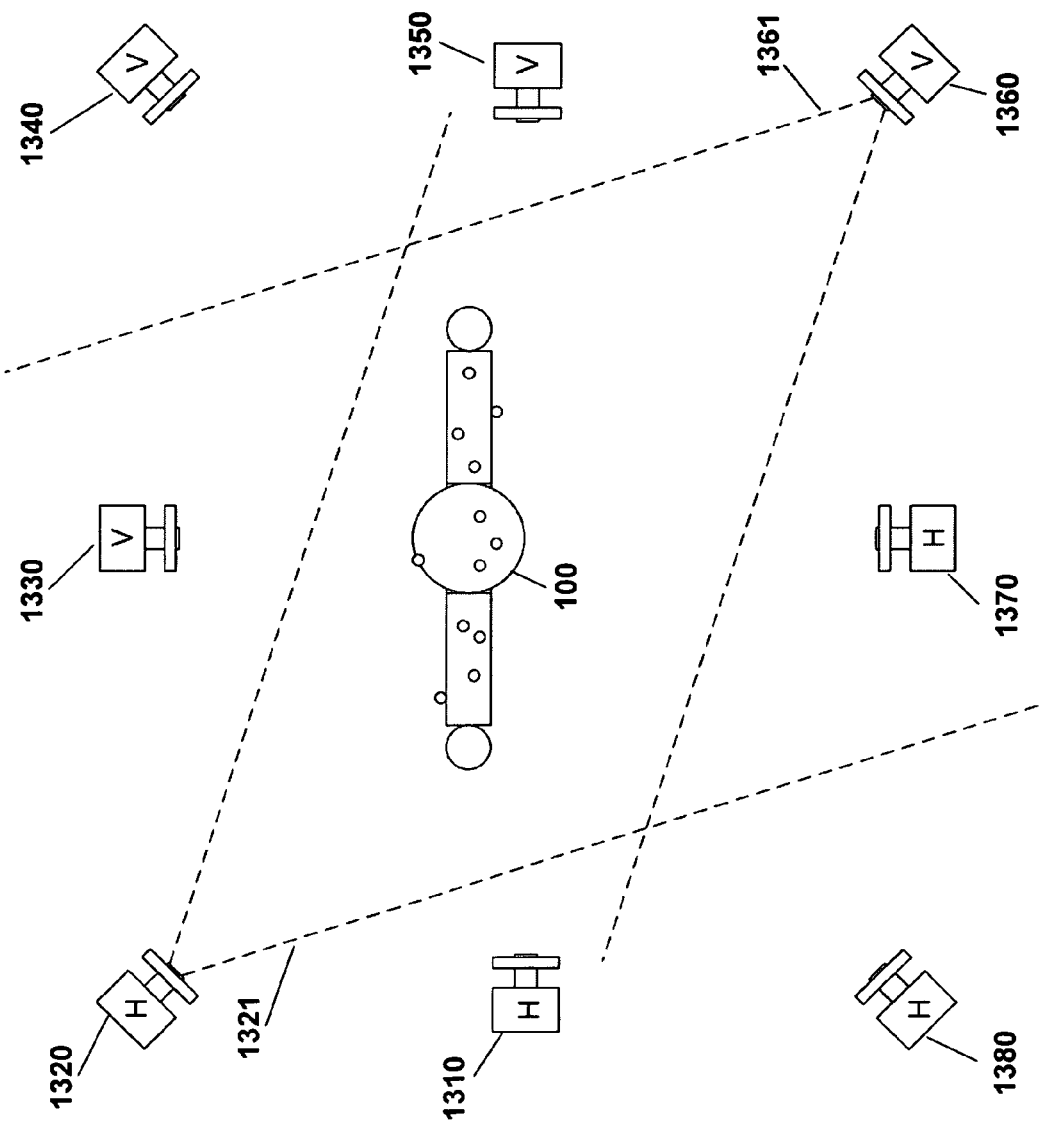

As indicated in FIGS. 13-14, with a significant number of cameras, certain horizontally-polarized cameras will still fall within the field of view of other horizontally-polarized cameras, and certain vertically-polarized cameras will still fall within the field of view of other vertically-polarized cameras. For example, vertically-polarized camera 1330 falls within the field of view 1361 of vertically-polarized camera 1360 and horizontally-polarized camera 1370 falls within the field of view 1321 of horizontally-polarized camera 1320. As a result, in one embodiment of the invention, the prior art techniques of adjusting camera positions is implemented along with the polarization techniques described herein. For example, camera 1320 may be placed at a different elevation from camera 1370 and camera 1360 may be placed at a different elevation from camera 1330.

Embodiments of the invention may include various steps as set forth above. The steps may be embodied in machine-executable instructions which cause a general-purpose or special-purpose processor to perform certain steps. Various elements which are not relevant to the underlying principles of the invention such as computer memory, hard drive, input devices, have been left out of the figures to avoid obscuring the pertinent aspects of the invention.

Alternatively, in one embodiment, the various functional modules illustrated herein and the associated steps may be performed by specific hardware components that contain hardwired logic for performing the steps, such as an application-specific integrated circuit ("ASIC") or by any combination of programmed computer components and custom hardware components.

Elements of the present invention may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the present system and method. It will be apparent, however, to one skilled in the art that the system and method may be practiced without some of these specific details. For example, while certain specific techniques are described above to attach polarized material to motion capture cameras, the underlying principles of the invention are not limited to any particular attachment mechanism.

Accordingly, the scope and spirit of the present invention should be judged in terms of the claims which follow.

What is claimed is:

1. A system comprising:
   a plurality of cameras configurable for a motion capture session, each of the cameras having an illuminating device for generating light and a lens for capturing light reflected off of one or more retro-reflective markers used for the motion capture session; and
   a plurality of pieces of polarized material coupled over the illuminating device and the lens of each of the cameras, wherein for each individual camera, either a first orientation or a second orientation for the polarized material is selected based on which other cameras are within the individual camera's field of view and the orientation of the polarized material used for the other cameras, the first orientation being perpendicular to the second orientation;
   wherein the polarized material used for each camera comprises: a first piece of polarized material coupled over the lens of each camera; and a second piece of polarized material coupled over the illuminating ring of each camera;
   one or more spirit levels coupled to the first piece of polarized material, the spirit levels configured to provide an absolute reference for the polarization orientation of the first piece of polarized material; and
   one or more spirit levels coupled to the second piece of polarized material, the spirit levels configured to provide absolute reference for the polarization orientation of the second piece of polarized material.

2. The system as in claim 1 wherein the first orientation is vertical and the second orientation is horizontal.

3. The system as in claim 1 wherein if the other cameras within the individual camera's field of view have polarized material in the first orientation, then the second orientation is selected for the individual camera.

4. The system as in claim 1 wherein the polarized material comprises polarized plastic.

5. The system as in claim 1 further comprising:
   an armature fixedly coupled to each camera; and
   a clip to hold the polarized material in place over the illuminating device and the lens.

6. The system as in claim 1 further comprising:
   a first threaded ring fixedly coupled around the periphery of the lens, wherein edges of the first piece of polarized material interface with the first threaded ring, thereby securing the first piece of polarized material over the lens, wherein the orientation of the first piece of polarized material is adjustable by moving the first piece of polarized material within the first threaded ring; and/or
   a second threaded ring fixedly coupled around the periphery of the illuminating ring, wherein edges of the second piece of polarized material interface with the second threaded ring, thereby securing the second piece of polarized material over the illuminating device, wherein the orientation of the second piece of polarized material is adjustable by moving the second piece of polarized material within the second threaded ring.

7. The system as in claim 1 wherein the illuminating ring comprises a plurality of light emitting diodes ("LEDs").

8. An apparatus comprising:
   polarization means to polarize light transmitted from an illuminating device and received by a lens on each of a plurality of motion capture cameras; and
   attachment and adjustment means to couple the polarization means over the illuminating device and the lens and to provide for adjustment of the polarization means to either a first orientation or a second orientation, wherein either the first or second orientations are selected for an individual camera based on which other cameras are within the individual camera's field of view and the orientation of the polarized material used for the other cameras, the first orientation being perpendicular to the second orientation;
   wherein the polarization means further comprises: a first piece of polarized material attachable over the lens of each camera; and a second piece of polarized material attachable over the illuminating ring of each camera;
   one or more spirit levels coupled to the first piece of polarized material, the spirit levels configured to provide an absolute reference for the polarization orientation of the first piece of polarized material; and
   one or more spirit levels coupled to the second piece of polarized material, the spirit levels configured to provide an absolute reference for the polarization orientation of the second piece of polarized material.

9. The apparatus as in claim 8 wherein the first orientation is vertical and the second orientation is horizontal.

10. The apparatus as in claim 8 wherein if the other cameras within the individual camera's field of view have polarized material in the first orientation, then the second orientation is selected for the individual camera.

11. The apparatus as in claim 8 wherein the polarized material comprises polarized plastic.

12. The apparatus as in claim 8 wherein the attachment means further comprises:
    an armature fixedly coupled to each camera; and
    a clip to hold the polarized material in place over the illuminating device and the lens.

13. The apparatus as in claim 8 wherein the attachment and adjustment means further comprises:
    a first threaded ring fixedly coupled around the periphery of the lens, wherein edges of the first piece of polarized material interface with the first threaded ring, thereby securing the first piece of polarized material over the lens, wherein the orientation of the first piece of polarized material is adjustable by moving the first piece of polarized material within the first threaded ring; and/or
    a second threaded ring fixedly coupled around the periphery of the illuminating ring, wherein edges of the second piece of polarized material interface with the second threaded ring, thereby securing the second piece of polarized material over the illuminating device, wherein the orientation of the second piece of polarized material is adjustable by moving the second piece of polarized material within the second threaded ring.

14. The apparatus as in claim 8 wherein the attachment and adjustment means further comprises leveling means to provide an absolute reference for adjusting the polarization means to the first and/or second orientation.

15. The apparatus as in claim 14 wherein the leveling means comprises a spirit level.

* * * * *